(12) United States Patent
Roth et al.

(10) Patent No.: US 11,207,766 B2
(45) Date of Patent: Dec. 28, 2021

(54) MOUNTING DEVICE FOR USE IN A STRIP ASSEMBLY AND METHOD FOR CARRYING OUT IN A STRIP ASSEMBLY

(71) Applicant: Elkamet Kunststofftechnik GmbH, Biedenkopf (DE)

(72) Inventors: Hartmut Roth, Biedenkopf (DE); Lutz Bergmann, Ehringshausen (DE); Carsten Burk, Dautphetal (DE); Christoph Hain, Breidenbach (DE); Marco Hain, Eschenburg (DE); David Landeck, Marburg (DE); Jens Loehnert, Lohra (DE); Michael Ortmueller, Dautphetal-Herzhausen (DE); Marcus Schneider, Dautphetal (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 81 days.

(21) Appl. No.: 16/340,394

(22) PCT Filed: Feb. 6, 2018

(86) PCT No.: PCT/EP2018/052923
§ 371 (c)(1),
(2) Date: Apr. 9, 2019

(87) PCT Pub. No.: WO2018/171972
PCT Pub. Date: Sep. 27, 2018

(65) Prior Publication Data
US 2019/0240820 A1 Aug. 8, 2019

(30) Foreign Application Priority Data
Mar. 23, 2017 (EP) .................................. 17162529

(51) Int. Cl.
*B23P 19/04* (2006.01)
*B25B 27/00* (2006.01)
(Continued)

(52) U.S. Cl.
CPC ........ *B25B 27/0092* (2013.01); *B23P 19/047* (2013.01); *B25B 27/0035* (2013.01);
(Continued)

(58) Field of Classification Search
CPC .. B25B 27/0092; B25B 27/0035; B60J 10/00; B60J 10/30; B60J 10/70; B23P 19/047
See application file for complete search history.

(56) References Cited

U.S. PATENT DOCUMENTS 3,744,113 A * 7/1973 Sarvay .................... E04F 21/28
29/235
5,776,403 A * 7/1998 Yada ........................ B60J 10/22
264/259
(Continued)

FOREIGN PATENT DOCUMENTS

DE 20008555 U1 8/2000
DE 60013907 T2 1/2005
(Continued)

*Primary Examiner* — Lawrence Averick
(74) *Attorney, Agent, or Firm* — Leydig, Voit & Mayer, Ltd.

(57) ABSTRACT

A mounting device is useable with a strip arrangement comprising a profile strip arrangeable or arranged at an edge area of a window pane of a motor vehicle and comprising a transport protection strip, wherein the transport protection strip is arranged at least with a portion of its cross section in a receiving area of the profile strip. The mounting device has a guide-in area configured to guide a free end of the strip arrangement into the mounting device, and a separation area configured to separate the transport protection strip from the profile strip.

22 Claims, 11 Drawing Sheets

(51) Int. Cl.
    *B60J 10/70*     (2016.01)
    *B60J 10/00*     (2016.01)
    *B60J 10/30*     (2016.01)

(52) U.S. Cl.
    CPC .............. *B60J 10/00* (2013.01); *B60J 10/30* (2016.02); *B60J 10/70* (2016.02)

(56) References Cited

U.S. PATENT DOCUMENTS

| | | | |
|---|---|---|---|
| 6,789,947 B1 | 9/2004 | Kasai | |
| 6,868,595 B1 | 3/2005 | Cycholl | |
| 2003/0041892 A1 | 3/2003 | Fleurial et al. | |
| 2003/0057660 A1 | 3/2003 | Ortmueller et al. | |
| 2003/0077009 A1 | 4/2003 | Schreiter | |
| 2003/0194155 A1* | 10/2003 | Plourde | B65D 33/2591 383/64 |
| 2005/0041892 A1* | 2/2005 | Stolmeier | B65D 33/2591 383/64 |
| 2005/0074604 A1* | 4/2005 | Gearhart | B60J 10/80 428/343 |
| 2006/0029301 A1 | 2/2006 | Schreiter et al. | |
| 2007/0246966 A1 | 10/2007 | Polke | |
| 2011/0115261 A1 | 5/2011 | Platt et al. | |
| 2015/0246603 A1 | 9/2015 | Silvestrini | |

FOREIGN PATENT DOCUMENTS

| | | | |
|---|---|---|---|
| DE | 202008006986 U1 | 10/2009 | |
| DE | 102011054801 A1 | 4/2013 | |
| DE | 102012110472 B3 | 3/2014 | |
| EP | 2253556 A1 | 11/2010 | |
| EP | 2586638 A2 | 5/2013 | |
| FR | 2015-719225 * | 5/2014 | ............. B60J 10/70 |
| FR | 3020994 A1 | 11/2015 | |
| WO | WO 2006002891 A2 | 1/2006 | |
| WO | WO 2011064484 A1 | 6/2011 | |
| WO | WO 2014041279 A1 | 3/2014 | |

\* cited by examiner

MOUNTING DEVICE FOR USE IN A STRIP ASSEMBLY AND METHOD FOR CARRYING OUT IN A STRIP ASSEMBLY

CROSS-REFERENCE TO PRIOR APPLICATIONS

This application is a U.S. National Stage Application under 35 U.S.C. § 371 of International Application No. PCT/EP2018/052923 filed on Feb. 6, 2018, and claims benefit to European Patent Application No. EP 17162529.6 filed on Mar. 23, 2017. The International Application was published in German on Sep. 27, 2018 as WO 2018/171972 A1 under PCT Article 21 (2).

FIELD

The invention relates to a mounting device to be used with a strip arrangement, which comprises a profile strip that is arrangeable or arranged at an edge area of a window pane of a motor vehicle and which also comprises a transport protection strip, the transport protection strip being arranged at least with a portion of its cross section in a receiving area of the profile strip.

BACKGROUND

Profile strips known from the prior art, for example, from German utility model DE 200 08 555 U1 and German utility model DE 20 2008 006 986 U1, serve to connect a lower edge area of a windshield of a motor vehicle to an adjoining motor vehicle component. The adjoining motor vehicle component is, in particular, a so-called water box cover that is usually latched with a connecting section of the profile strip by an attachment web of the water box cover being inserted into a receiving area of the connecting section and being attached there, usually in a latching manner. The water box cover serves to cover a water box that collects water running off the motor vehicle windowpane and to drain it away in a controlled manner into the engine compartment and to underneath the vehicle. The water box can be part of the vehicle body.

After the profile strip has been manufactured, it is connected to the edge area of the windshield, usually glued to it. This assembly step is usually carried out by the suppliers, so that the suppliers can provide the automobile manufacturer with a module comprising the windshield and the profile strip that is connected to the windshield. This module is then connected to a windshield receptacle of a motor vehicle body in the context of the final assembly of a motor vehicle; moreover, the adjoining motor vehicle component is joined to the profile strip.

During the transport of the above-mentioned module from the supplier to the automobile manufacturer, the connecting section of the profile strip intended for being connected to the adjoining component projects away from the windshield and is thus exposed to mechanical influences. At the same time, however, it is desirable for the module to be transported in a space-saving manner and in a "standing" position, that is to say, for the windshield to be transported upright. It is moreover desirable for the windshield to be protected against damage to its lower edge area during the transport. Such a protection is ensured in that the windshield rests on the connecting section of the profile strip while it is being transported. However, this means that the weight of the windshield bears down on the connecting section of the profile strip during the transport of the module. This load brings about an undesired deformation (compression) of the connecting section of the profile strip that delimits the receiving area.

In order to prevent deformation of a profile strip that is connected to a windshield, it is known from the prior art (for example, from international patent application WO 2006/002891 A2, European patent application EP 2 253 556 A1, and international patent application WO 2014/041279 A1) to reinforce the connecting section of the profile strip by using a transport protection strip (also referred to as a "keder rail") that is arranged at least with a portion of its cross section in the receiving area of the connecting section.

After the module of "windshield and profile strip" has been delivered to the automobile manufacturer, the transport protection strip is then removed from the receiving area of the profile strip so that the connecting section can be connected to the adjoining motor vehicle component, in particular, to the water box cover. The transport protection strip is subsequently disposed of.

In order to remove the transport protection strip from the receiving area of the connecting section of the profile strip, European patent application EP 2 253 556 A1 proposes providing the transport protection strip with an additional handling section in the form of a gripping tab so that the transport protection strip can be extracted from the receiving area of the profile strip by manually pulling at the gripping tab. A similar handling section in the form of a pull-out ring is known from international patent application WO 2014/041279 A1.

SUMMARY

In an embodiment, the present invention provides a mounting device to be used with a strip arrangement. The strip arrangement comprises a profile strip arrangeable or arranged at an edge area of a window pane of a motor vehicle and comprises a transport protection strip, wherein the transport protection strip is arranged at least with a portion of its cross section in a receiving area of the profile strip. The mounting device has a guide-in area configured to guide a free end of the strip arrangement into the mounting device, and a separation area configured to separate the transport protection strip from the profile strip.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
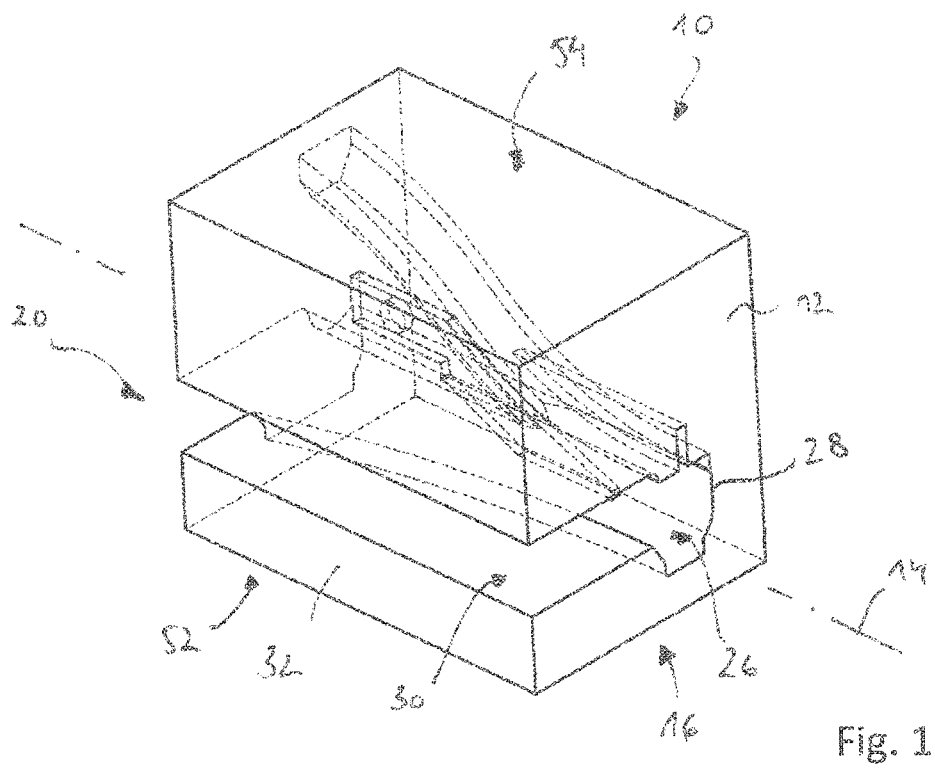
FIG. 1 a perspective illustration of an embodiment of a mounting device.
Figure 2:
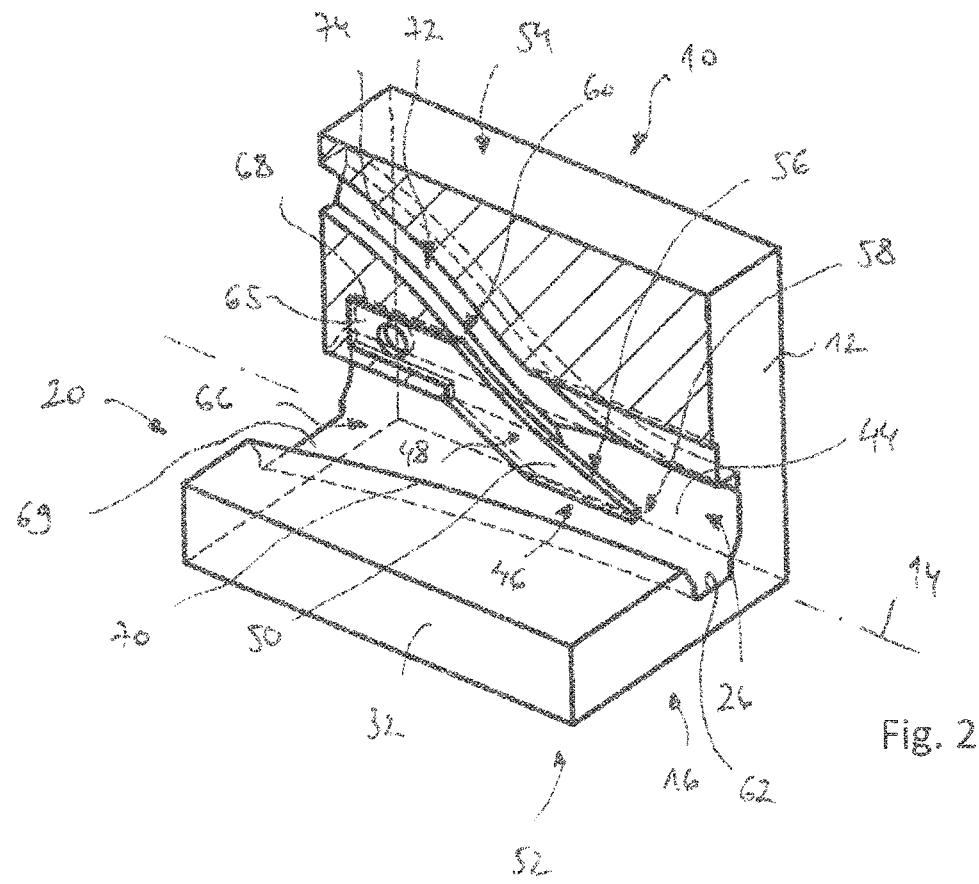
FIG. 2 the mounting device according to FIG. 1 in a partial section.

The above-mentioned additional handling sections simplify the removal of the transport protection strip from the receiving area of the profile strip. However, the transport protection strip and the handling sections first have to be manufactured as individual parts and then the supplier has to mount them onto the profile strip. After the module has been transported to the automobile manufacturer, the automobile manufacturer has to then disassemble the transport protection strip and the handling sections. Finally, the transport protection strip and the handling sections have to be collected and disposed of.

Embodiments of the present invention provide a mounting device to be used with a strip arrangement and a method to be carried out with a strip arrangement by means of which it is possible to reduce the effort involved in conjunction with the handling of the transport protection strip.

This advantage is achieved according to embodiments of the invention by means of a mounting device that has a guide-in area for a free end of the strip arrangement to be guided into and also has a separation area for the transport protection strip to be separated from the profile strip.

The mounting device according to an embodiment of the invention has two essential areas. The guide-in area serves for the free end of the strip arrangement to be guided into the mounting device. This enables a relative positioning between the free end of the strip arrangement and the separation area, which is configured for the transport protection strip to be separated from the profile strip.

The mounting device according to an embodiment of the invention has the advantage that separate handling sections to be attached to the transport protection strip (as are known from the prior art) can be dispensed with.

The mounting device according to an embodiment of the invention is reusable for a multitude of strip arrangements. After the free end of the strip arrangement has been guided into the guide-in area and after the transport protection strip has been separated from the profile strip, the mounting device can then be removed from the at least in sections separated components "transport protection strip and profile strip", and the mounting device can be used for another strip arrangement. That is to say that the mounting device can be held available stationarily in a manufacturing environment of a supplier or of an automobile manufacturer, and it does not have to be "transported along" together with vehicle window panes and strip arrangements.

It is preferable for the guide-in area to have a guide-in profile that is at least in sections complementary to the cross section of the strip arrangement. In particular, the strip arrangement is only guidable into the guide-in area of the strip arrangement in one rotational orientation in relation to a longitudinal axis of the strip arrangement.

In one embodiment of the invention, the guide-in profile is circumferentially closed. This means that a free end of the strip arrangement that has been guided into the guide-in area is enclosed by guide sections of the guide-in profile along its entire circumference. Such a guide-in profile that is closed in circumferential direction enables a particularly reliable relative positioning of the strip arrangement and of the separation area of the mounting device.

In an alternative embodiment, the guide-in profile has a guide-in profile opening in which an edge area of a windowpane is arrangeable. This embodiment has the advantage that the mounting device can be used to separate a transport protection strip from the profile strip even when the profile strip has already been attached to a window pane.

The guide-in profile is preferably delimited by wall sections of a housing of the mounting device. Such a housing can be manufactured from a plastic material, for example. The housing can have external dimensions that enable the mounting device to be operated by hand and to be used as a hand tool. As an addition or alternative thereto, the housing can also be part of a mechanical production means.

The guide-in profile can at least in sections be delimited by friction-reducing guide sections and/or drive sections. For example, non-driven running rollers and/or drive rollers can be used that also serve to delimit the guide-in profile by a running surface or drive surface facing toward the strip arrangement.

In the context of an embodiment of the invention, it is furthermore proposed that the separation area has a lifting means with a ramp section that at least in sections reaches underneath the transport protection strip and lifts it out of the receiving area of the profile strip. Such a ramp section has the advantage that the transport protection strip, which is initially still arranged in the receiving area of the profile strip, can glide along its length over the ramp section, and that the transport protection strip can thus be detached from the profile strip in a gentle, simple manner and using only small operating forces.

The ramp section can be formed, for example, by a section of a housing, or of the housing, of the mounting device, whereby a particularly simple and low-cost mounting device is created. The ramp section can as an addition or alternative thereto be formed by an in particular blade-shaped additional element. Such an additional element is manufactured, for example, from a metal material, and is connected to the housing of the mounting device. It is possible for the connection between additional element and housing to be formed to be durable and non-detachable, for example, by an additional element of metal being coated with plastic material. It is also possible, however, to detachably connect the additional element to a housing of the mounting device in order to attach an additional element replacement on the mounting device after a potential wear of the additional element.

It is furthermore preferable for the mounting device to have a profile strip guide-out area and/or a transport protection strip guide-out area. These guide areas serve to guide the profile strip sections and the transport protection strip sections that have already been separated from each other in such a manner that the profile strip and/or the transport protection strip take up a defined spatial position relative to the mounting device in order to simplify the further handling of the strip arrangement or of the components of the strip arrangement that have been separated from each other.

In the context of an embodiment of the invention, it is possible that the profile strip guide-out area and/or the transport protection strip guide-out area is or are terminally open. This enables to use the mounting device at the strip arrangement along the entire length of the strip arrangement in order to thus separate the transport protection strip along its entire length from the profile strip.

It is also possible that the profile strip guide-out area and/or the transport protection strip guide-out area is or are terminally closed. In this manner, it is possible to separate a transport protection strip from the profile strip in the area of a free end of the strip arrangement until the free end of the profile strip and/or the free end of the transport protection strip come into abutment with a closure at the end of a guide-out area. Subsequently, the mounting device can be removed (in opposite direction), and the transport protection strip can be completely separated from the profile strip by seizing the transport protection strip manually or by machine in the area of its section that has already been separated from the profile strip, and then separating the transport protection strip from the profile strip also along the remaining length.

In a particularly preferred embodiment of the invention, the mounting device has a merge area for a transport protection strip section that is separate from the receiving area of the profile strip to be merged with the profile strip. Such a merge area makes it possible for a transport protection strip section that has already been separated from the profile strip to be reconnected to the receiving area of the profile strip.

For this purpose, a press-in section, for example, can be provided that presses the transport protection strip at least with a portion of its cross section into the receiving area of the profile strip.

The press-in section can be formed by a section of the housing of the mounting device and/or by an in particular block-shaped or roll-shaped additional element.

The advantages of merging the transport protection strip and the profile strip are explained below with reference to the method according to embodiments of the invention.

In the context of an embodiment of the invention, it is possible that the mounting device has a one-piece housing that is particularly easy to handle.

The mounting device can also have a multi-piece housing, with the housing comprising a first housing part that has at least the guide-in area and the separation area and also comprising a second housing part that has at least one above-mentioned merge area. Such a multi-piece housing construction makes it possible to provide the two functions "separating" and "merging" of profile strip and transport protection strip in a manner spatially separated from each other and offset to each other in longitudinal direction of the strip arrangement.

It is possible for the housing parts to be rigidly or movably connected to each other. A rigid connection makes it possible to handle the mounting device as if it were made in one piece. If the housing parts are movably connected to each other, it is particularly advantageous for the housing parts to be able to follow a curvature of a strip arrangement in a movement of the mounting device along the strip arrangement. Such a curvature can be envisaged when the profile strip has a curved course corresponding to the curvature of a lower edge area of a windshield traced by the profile strip.

In particular in the instance of housing parts that are movably connected to each other (but also in the instance of housing parts that are rigidly connected to each other), it is possible that there is a spacing between the exit side of the first housing part and a thereto adjacent entry side of the second housing part. This means that an exit of the profile strip guide-out area at the first housing part and an entry of a guide channel provided for the profile strip in the second housing part, as well as an exit of the transport protection strip guide-out area at the first housing part and an entry of a guide channel provided for the transport protection strip in the second housing part, are also spaced apart from each other. In this instance it is advantageous for the guide channels to have funnel-shaped guide-in areas at the entry side of the second housing part.

It is possible in the context of an embodiment of the invention that the mounting device is handled manually and is moved along at least a part of the longitudinal extension of the strip arrangement by manual power and/or that a strip arrangement is moved through the mounting device (held manually or attached to a carrier) by hand.

It is also possible for a drive means to be provided, which generates a relative movement between strip arrangement and mounting device, the relative movement being directed along the strip arrangement. In this connection it is possible for the mounting device to be moved along a stationary strip arrangement. It is also possible to drive the strip arrangement along a stationary mounting device. The above-mentioned drive options can moreover be combined with each other.

An embodiment of the invention further relates to a method to be carried out with a strip arrangement, which comprises a profile strip that is arrangeable or arranged at an edge area of a windowpane of a motor vehicle and which comprises a transport protection strip, with the transport protection strip being arranged at least with a portion of its cross section in a receiving area of the profile strip, where the method is characterized by a free end of the strip arrangement being guided into a guide-in area of a mounting device and is characterized by a free end of the transport protection strip being separated from the profile strip in a separation area of the mounting device.

Advantages and embodiments of the method according to the invention have in parts already been described above with reference to the mounting device according to embodiments of the invention. Reference is therefore made to the above description. Further advantages and embodiments of the method according to embodiments of the invention will be additionally described below.

In a particularly preferred method, a mounting device is used that comprises a merge area for transport protection strip and profile strip to be merged. In this method, the profile strip is guided along a first guide path having a first length. Furthermore, a transport protection strip section that is separate from the profile strip is guided along a second guide path having a second length that is different from the first length. In addition, sections of the transport protection strip and of the profile strip, which are connected to each other in the initial state and which are then separated from each other, are remerged, and the transport protection strip is pressed into the receiving area of the profile strip. This method makes it possible to change a specific initial state of a strip arrangement having a specific relative positioning of transport protection strip and profile strip (in relation to the longitudinal extension of the strip arrangement), namely by the guide paths for the profile strip and for the transport protection strip having different lengths. By passing sections of transport protection strip and profile strip that have been separated from each other through differently long guide paths and subsequently merging them, the mentioned initial state is changed in such a manner that a specific transport protection strip section is rejoined with the profile strip in a changed position, as seen in longitudinal direction of the strip arrangement and in relation to the initial state. Based on an initial state of the strip arrangement, it is in this way possible to offset the transport protection strip relative to the profile strip in longitudinal direction by a specific measure of length.

It is particularly preferred for the second length (corresponds to the guide path of the transport protection strip) to be greater than the first length (corresponds to the guide path of the profile strip). In this way, it is possible to guide the profile strip, which is usually dimensionally more stable in relation to the transport protection strip, along a shorter guide path, and to guide the less stable and therefore more flexible transport protection strip along a second, longer guide path.

A longer guide path can have a stronger curvature, in particular in relation to a shorter guide path. Ideally, the shorter guide path is largely straight or has only a curvature that corresponds to the curvature of a lower edge area of an adjoining windshield. This curvature runs parallel to a plane of a windowpane at which the profile strip is arranged or arrangeable; the "stronger curvature" of the longer guide path preferably runs in a direction inclined or perpendicular to the plane of the windowpane.

Particular advantages result if the strip arrangement being guided into the guide-in area has ends of the profile strip and of the transport protection strip that are flush with each other, and if these ends, after at least a portion of the cross section of the transport protection strip has been pressed into the receiving area of the profile strip, are offset by a measure of length corresponding to the difference of the lengths of the guide paths.

This makes it possible to provide a strip arrangement having free ends that are initially flush with each other. Such a flush end can be produced, for example, by the profile strip and the transport protection strip each being manufactured in a continuous process (for example, by extrusion) and being joined to each other. These continuous strip arrangements can subsequently be cut to length by means of a cutting tool, for example, such that individual strip arrangements are produced, the lengths of which correspond to the length of a lower edge area of a windshield. When such an individual strip arrangement is processed in a manner as described above by the transport protection strip first being removed in sections from the profile strip and, subsequently, sections that have been separated from each other being remerged, with the lengths of the guide paths of profile strip and transport protection strip differing from each other, the flush arrangement of the ends of profile strip and transport protection strip is changed into an offset arrangement of the ends of profile strip and transport protection strip, with the measure of length of the offset of the free ends of profile strip and transport protection strip corresponding to the difference of the lengths of the guide paths.

It is possible, for example, to process an individual strip arrangement with a profile strip and a thereto attached transport protection strip, where the particular end faces of the profile strip and of the transport protection strip are flush with each other at both free ends of the strip arrangement that face away from each other. After the above-discussed method has been passed through and the mounting device has been used along the entire length of such a strip arrangement, the end face of a first free end of the transport protection strip is offset further into the profile strip, as seen in longitudinal direction of the strip arrangement; the opposite second free end of the transport protection strip, however, projects beyond the adjacent end face of the profile strip, as seen in longitudinal direction of the strip arrangement. Such an arrangement still makes it possible to provide an adequate transport protection. At the instant, however, when the transport protection strip is to be removed from the profile strip, the transport protection strip can be seized manually or by machine at its free end that projects beyond one of the free ends of the profile strip, and it can be completely separated from the profile strip by simple pulling or lifting of the transport protection strip.

The above-discussed method can also be used for individual strip arrangements in which the free ends of the profile strip and of the transport protection strip are not flush with each other, that is to say, ends of the profile strip and of the transport protection strip are provided that are offset relative to each other by a first measure of length. After at least a portion of the cross section of the transport protection strip has been pressed into the receiving area of the profile strip, these ends are offset by a second measure of length that is different from the first measure of length, with the value of the difference between the first measure of length and the second measure of length corresponding to the difference of the lengths of the guide paths.

The above-described methods are particularly well suited to be used following immediately after the manufacture of a strip arrangement. This has the advantage that a supplier manufacturing the profile strip (and/or a module comprising a windowpane and a thereto attached profile strip), can already prepare the profile strip and/or the module for a transport protection, but in such a manner that the handling sections known from the prior art are not required in the context of the final assembly of the module by the automobile manufacturer. It is thus also not necessary to use the mounting device according to an embodiment of the invention in the final assembly of the motor vehicle, since this assembly step can already be carried out by the supplier.

An embodiment of the invention accordingly also relates to the use of a previously described mounting device to carry out an above-described method.

An embodiment of the mounting device illustrated in the FIGS. 1 to 9 is designated in its entirety by the reference numeral 10. The mounting device 10 has a one-piece, block-shaped housing 12. The housing 12 consists, for example, of a plastic material that is applied layer by layer in a 3D printing process.

Figure 4:
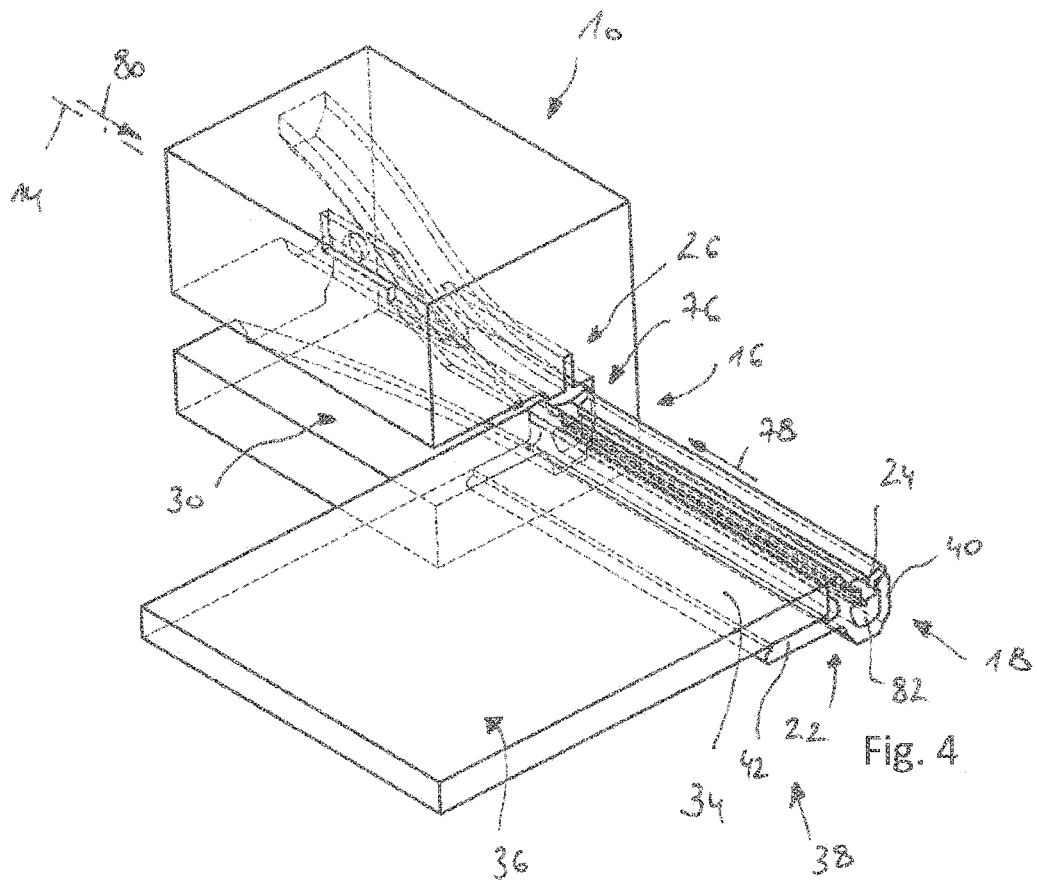
FIG. 4 an arrangement with the mounting device according to FIG. 1 and with a strip arrangement arranged at an edge area of a windowpane of a motor vehicle, prior to a free end of the strip arrangement being guided into a guide-in area of the mounting device.
Figure 9:
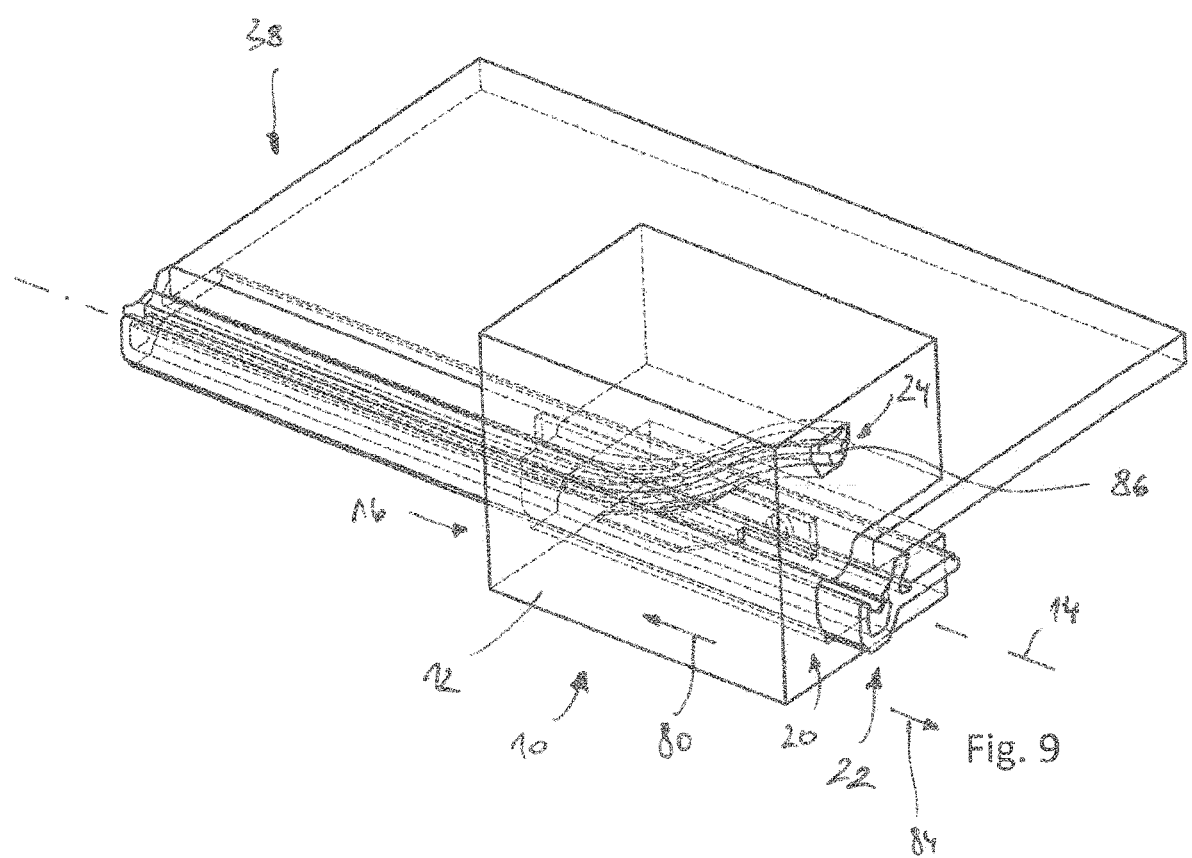
FIG. 9 the arrangement according to FIG. 7 from a rear perspective.

The housing 12 extends along a main axis 14 between an entry side 16 serving for a strip arrangement 18 as illustrated, for example, in FIG. 4, to be guided into, and, facing away from the entry side 16, an exit side 20 where a profile strip 22 and a transport protection strip 24 of the strip arrangement 18 are guided out of the housing 12 of the mounting device 10 in a state separated from each other (see FIG. 9).

Adjoining the entry side 16, and starting from the entry side 16, a guide-in area 26 extends into the inside of the housing 12, and along the main axis 14. The guide-in area 26 has a cross section with a guide-in profile 28 that is formed, as seen along a circumference of the guide-in profile, by wall sections of the housing 12. The guide-in profile 28 has a guide-in profile opening 30 extending along a sidewall 32 of the housing 12 and serving for an edge area 34 of a windowpane 36 to be arranged in (see FIG. 4). The sidewall 32 extends between the entry side 16 and the exit side 20.

The windowpane 36 is, in particular, the windshield of a motor vehicle. A group of components comprising the windowpane 36 as well as a strip arrangement 22 with a profile strip 18 and a transport protection strip 24, where the profile strip 18 is connected to the windowpane 36 preferably by gluing, is referred to below and in the drawing as arrangement 38.

The guide-in area 26 is dimensioned such that the free end of a strip arrangement 18, which comprises a profile strip 22 and a transport protection strip 24 in a state joined to each other, is guidable into the guide-in area 26, namely, essentially along a direction parallel to the main axis 14 of the housing 12.

The profile strip 22 has a U-shaped receiving area 40 (see FIG. 4) accommodating the transport protection strip 24, at least with a portion of the cross section of the transport protection strip 24. Preferably, a latching connection or clamping connection forms a detachable connection between the profile strip 22 and the transport protection strip 24.

Protruding from the receiving area 40, the profile strip 22 has an attaching section 42, which, in an arrangement of the profile strip 22 at a windowpane 36, serves to be glued to the windowpane 36.

When the strip arrangement 18 is arranged in the guide-in area 26 of the mounting device, the attaching section 42 of the profile strip 22 and the edge area 34 of the windowpane 36 are arrangeable in the guide-in profile opening 30; the receiving area 40 of the profile strip 22 and the transport protection strip 24 are arrangeable in a guide-in channel 44 (see FIG. 2) of the guide-in area 26.

On a side facing away from the entry side 16, the guide-in channel 44 adjoins a separation area that is designated in its entirety by the reference numeral 46.

The separation area 46 has a lifting means 48, which is formed by a blade-shaped additional element 50. The additional element 50 extends in an imaginary vertical plane running between an underside 52 and a topside 54 of the housing 12. The additional element 50 is oriented in a direction parallel to the main axis 14 and has a ramp section 56 facing toward the topside 54 of the housing 12 and extending between a starting area 58 and an end area 60. The starting area 58 of the ramp section 56 has the smallest spacing to a guide-in channel boundary 62 adjacent to the underside 52; the end area 60 is maximally spaced apart from the boundary 62.

The starting area 58 is spaced apart from the entry side 16 less than the end area 60. Between the ramp section 56 and an imaginary horizontal plane extending parallel to the main axis 14 and being located between the underside 52 and the topside 54, an angle 64 (see FIG. 3) is formed that is preferably between approximately 5° and 85°, in particular, between approximately 15° and 45°.

The additional element 50 has an attaching section 65 arranged in a complementary receptacle 68 of the housing 12 and attached there, for example, by being coated with plastic material.

Starting from the separation area 46, on the side facing away from the guide-in area 26 and seen along the main axis 14, a profile strip guide-out area 66 follows, the bottom boundary 69 of which merges continuously into the bottom boundary 62 of the guide-in area 26. A lateral boundary 70 of the guide-in channel 44 and of the profile strip guide-out area 66 extends between the entry side 16 and the exit side 20 and has a curved course, whereby it is made possible to also guide strip arrangements 18 with curved profile strips 22 into the guide-in area 26 and to guide the profile strip 22 out of the profile strip guide-out area 66.

A transport protection strip guide-out area 72 that is separate from the profile strip guide-out area 66 is formed in the housing 12 above the ramp section 56. The area 72 comprises a channel 74 protruding into the guide-in channel 44 and extending above the ramp section 56. The channel 74 has an incline that at least in a section adjoining the separation area 46 at least essentially corresponds to the incline of the ramp section 56.

Figure 3:
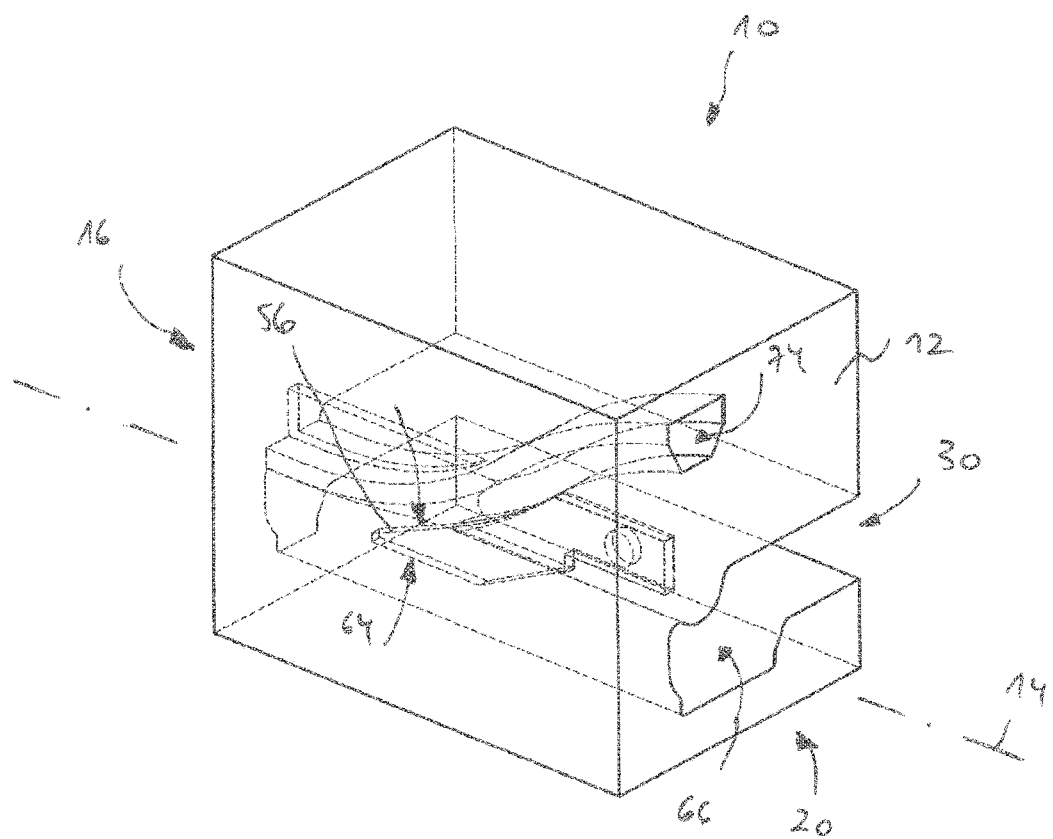
FIG. 3 the mounting device according to FIG. 1 from a rear perspective.

The guide-out areas 66 and 72 are terminally open, that is at the exit side 20, see FIG. 3.

Figure 5:
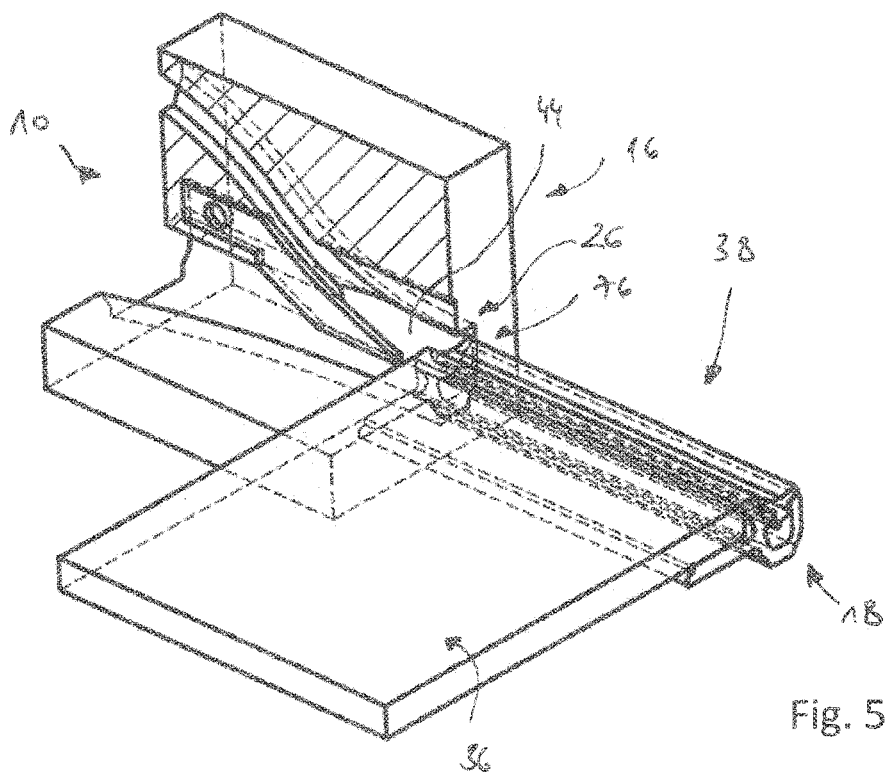
FIG. 5 the arrangement according to FIG. 4 in a partial section.
Figure 6:
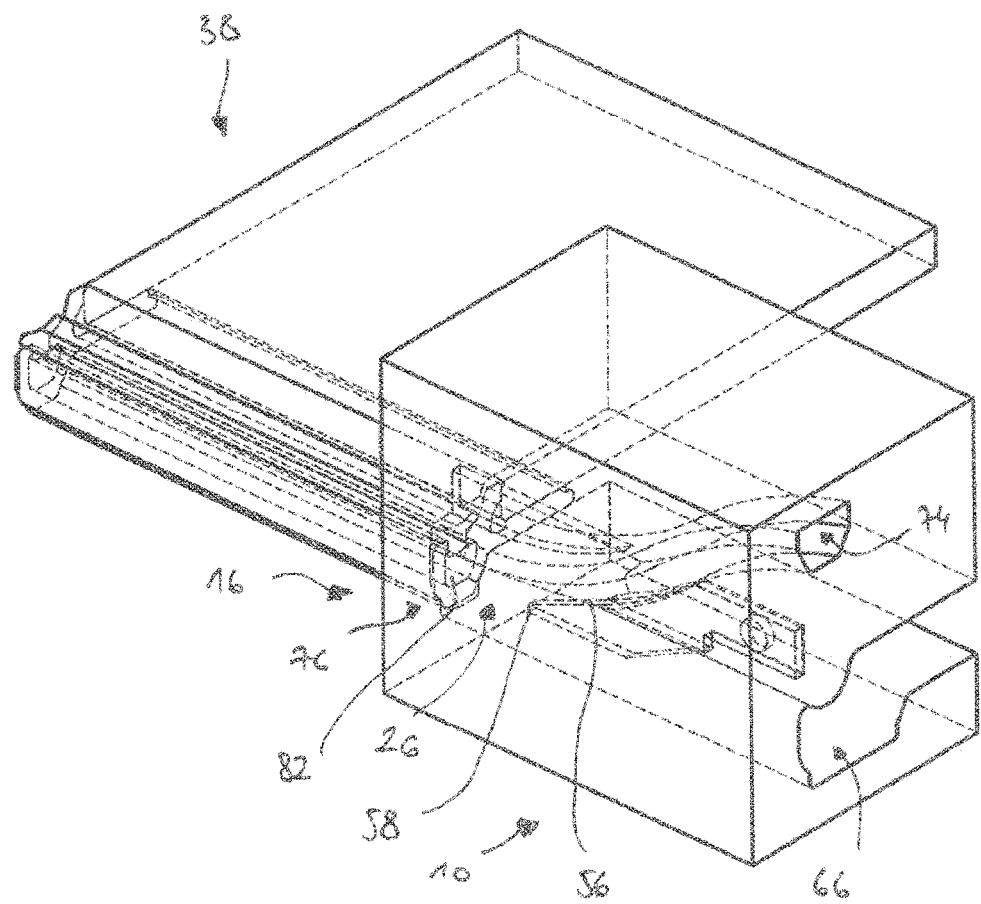
FIG. 6 the arrangement according to FIG. 4 from a rear perspective.
Figure 7:
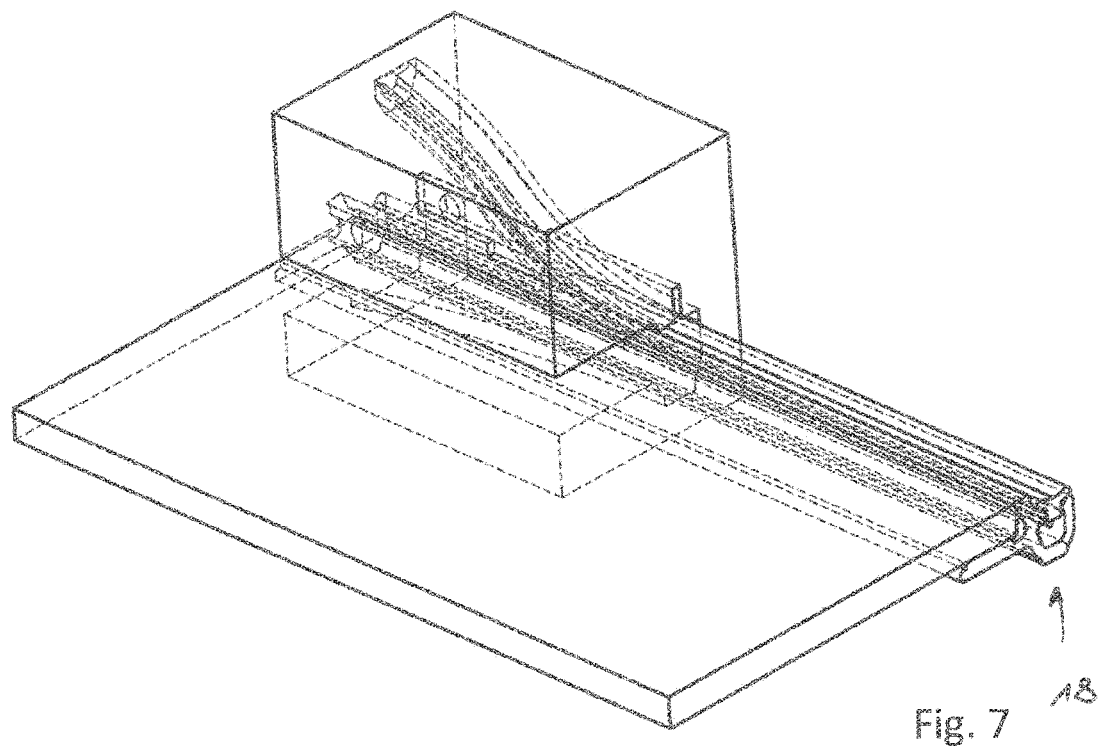
FIG. 7 the arrangement according to FIG. 4, after the free end of the strip arrangement has been guided into the guide-in area of the mounting device and after the free end of the transport protection strip has been separated from the profile strip in a separation area of the mounting device.
Figure 8:
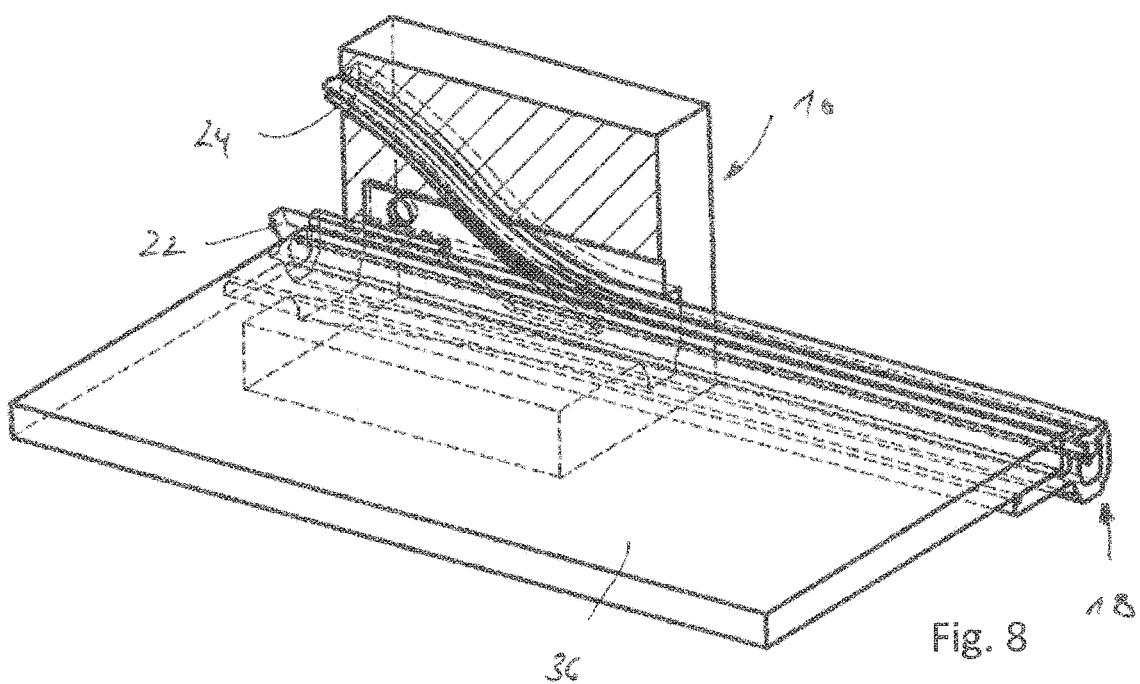
FIG. 8 the arrangement according to FIG. 7 in a partial section.

An arrangement 38 with a windowpane 36 and a thereto connected strip arrangement 18 is illustrated in FIGS. 4 to 6. A free end of the strip arrangement 18 is designated by the reference numeral 76. In order to separate the transport protection strip 24 from the profile strip 22, the free end 76 of the strip arrangement 18 is positioned adjacent to the entry side 16. Then the free end 76 of the strip arrangement 18 is guided into the guide-in area 26. This guide-in procedure can involve the arrangement 38, or at least the strip arrangement 18, being moved into the guide-in area 26 in a direction 78 parallel to the main axis 14 of the mounting device 10 and/or can involve the mounting device 10 being moved toward the free end 76 of the strip arrangement 18 in a direction 80 parallel to the main axis 14, see FIG. 4. A relative movement parallel to the main axis 14 in each instance takes place between the mounting device 10 and the strip arrangement 18.

After the free end 76 of the strip arrangement 18 has been guided into the guide-in channel 44 (see FIG. 5), the starting area 58 of the ramp section 56 comes into engagement with an area 82 between the underside of the transport protection strip 24 and an inner side of the receiving area 40 of the profile strip 22, see FIGS. 4 and 6.

A further relative movement between mounting device 10 and strip arrangement 18 along the main axis 14 brings about that the ramp section 56 reaches underneath the underside of the transport protection strip 24 and, corresponding to the incline of the ramp section 56, lifts the transport protection strip 24 out of the receiving area 40. As a result, a further relative movement between the strip arrangement 18 and the mounting device 10 in a direction parallel to the main axis 14 brings about that the profile strip 22, starting from the guide-in area 26, is guided into and through the profile strip guide-out area 66. This movement of the profile strip 22 is not impeded by the lifting means 48, since the additional element 50 is arranged within the U-shaped receiving area 40—as seen in a cross-sectional plane that runs perpendicular to the relative movement 78 or 80. The receiving area 40 and the additional element 50 can thus move relative to each other without colliding with one another.

The transport protection strip 24, by contrast, glides with its underside along on the ramp section 56 and follows the course of the channel 74 so that the transport protection strip 24 is guided out of the mounting device 10 spaced apart from the profile strip 22 on the exit side 20 of the mounting device 10, see FIG. 9.

Starting from the state according to FIG. 9, it is possible to separate the transport protection strip 24 along its entire length from the profile strip 22, for example, by the mounting device 10 being moved along the entire length of the profile strip 22 according to a direction 80 parallel to the main axis 14 as illustrated in FIG. 9.

Alternatively, however, it is also possible for the mounting device 10 to be moved in an opposite direction 84 parallel to the main axis 14 so that the mounting device 10 is again separated from the arrangement 38. After completing this separation, a transport protection strip section 86 that is separate from the profile strip 22 remains in a state separate from the profile strip 22. The section 86 can be seized, for example by hand or by machine, in order to separate the entire transport protection strip 24 from the profile strip 22. In this type of use, it can be advantageous for the guide-in profile 28 and the guide-in channel 44 to have greater clearances than in the embodiment shown in the FIGS. 1 to 9 in order for the separated transport protection strip 24 section 86 to be returned as little as possible toward the profile strip 22 when the mounting device 10 is being moved in the opposite direction 84.

The mounting device 10 can be designed as a hand tool. For this purpose, it is advantageous for the housing 12 of the mounting device to have rounded edges 88, in particular, in the passage between the entry side 16 and connecting surfaces 90 and the exit side 20 and the connecting surfaces 90, see FIGS. 10 and 11.

Figure 10:
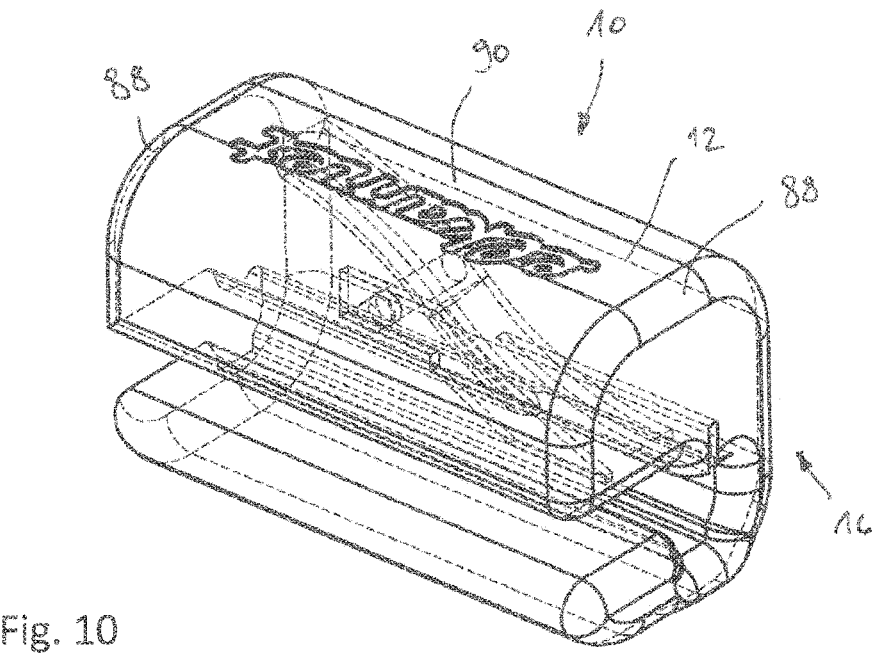
FIG. 10 a further embodiment of a mounting device.
Figure 11:
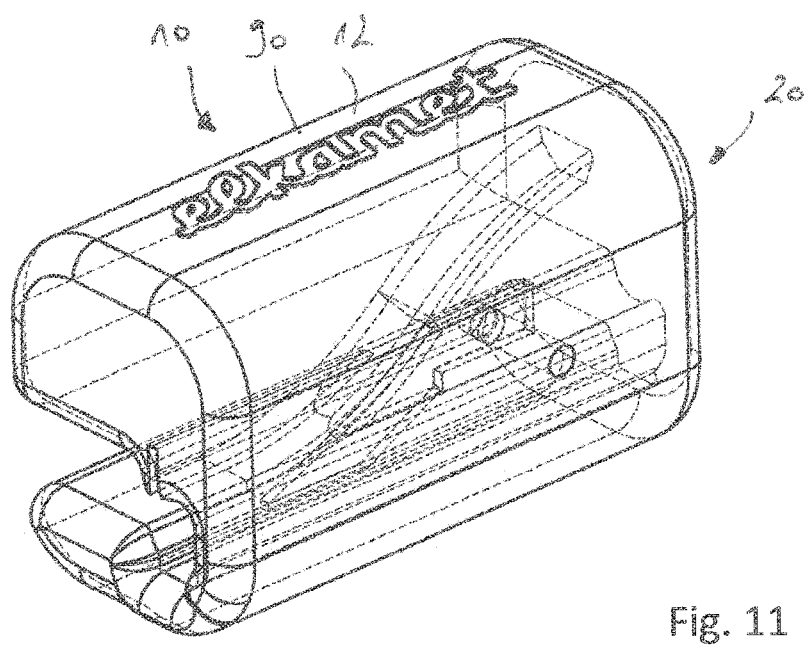
FIG. 11 the mounting device according to FIG. 10 from a perspective rotated by approximately 120°.

For the rest, the structure and the mode of operation of the mounting device 10 according to FIGS. 10 and 11 correspond to the structure and the mode of operation of the mounting device according to FIGS. 1 to 9. Reference is therefore made to the above description.

Figure 12:
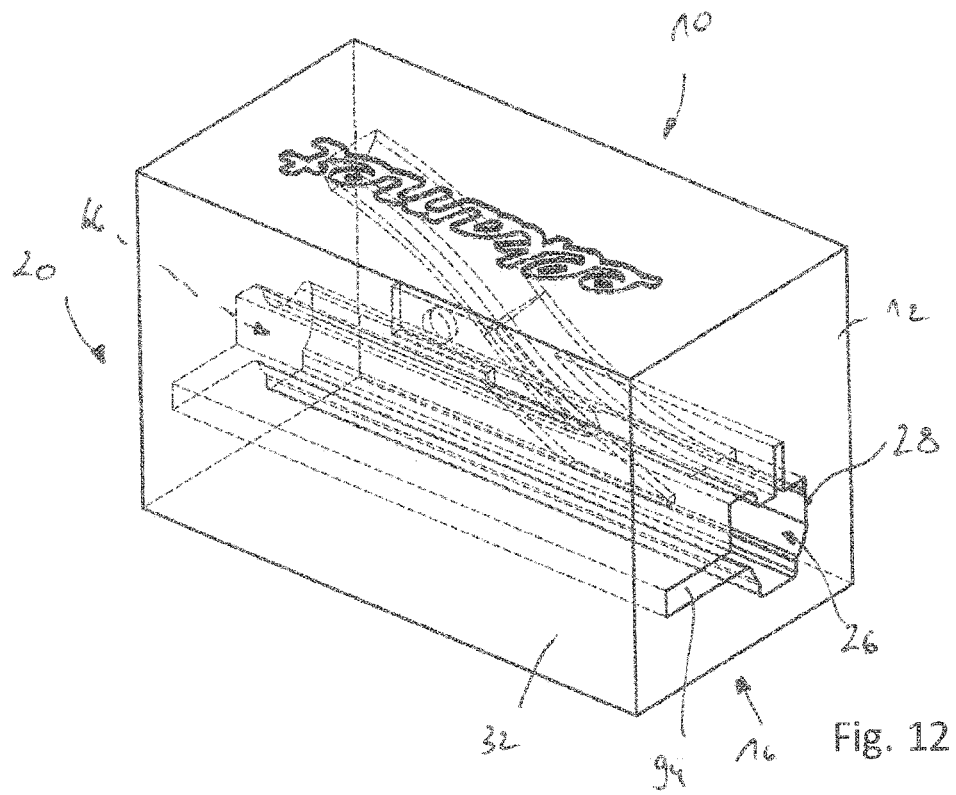
FIG. 12 a further embodiment of a mounting device with a circumferentially closed guide-in area.
Figure 13:
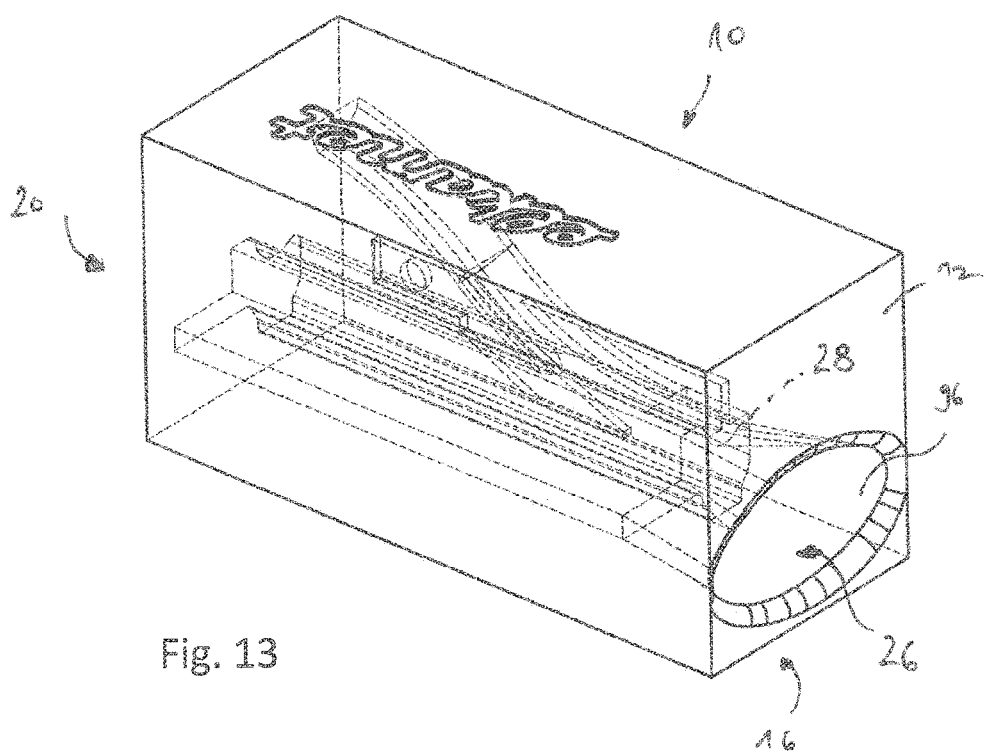
FIG. 13 a further embodiment of a mounting device with a circumferentially closed guide-in area that is formed to be funnel-shaped.
Figure 14:
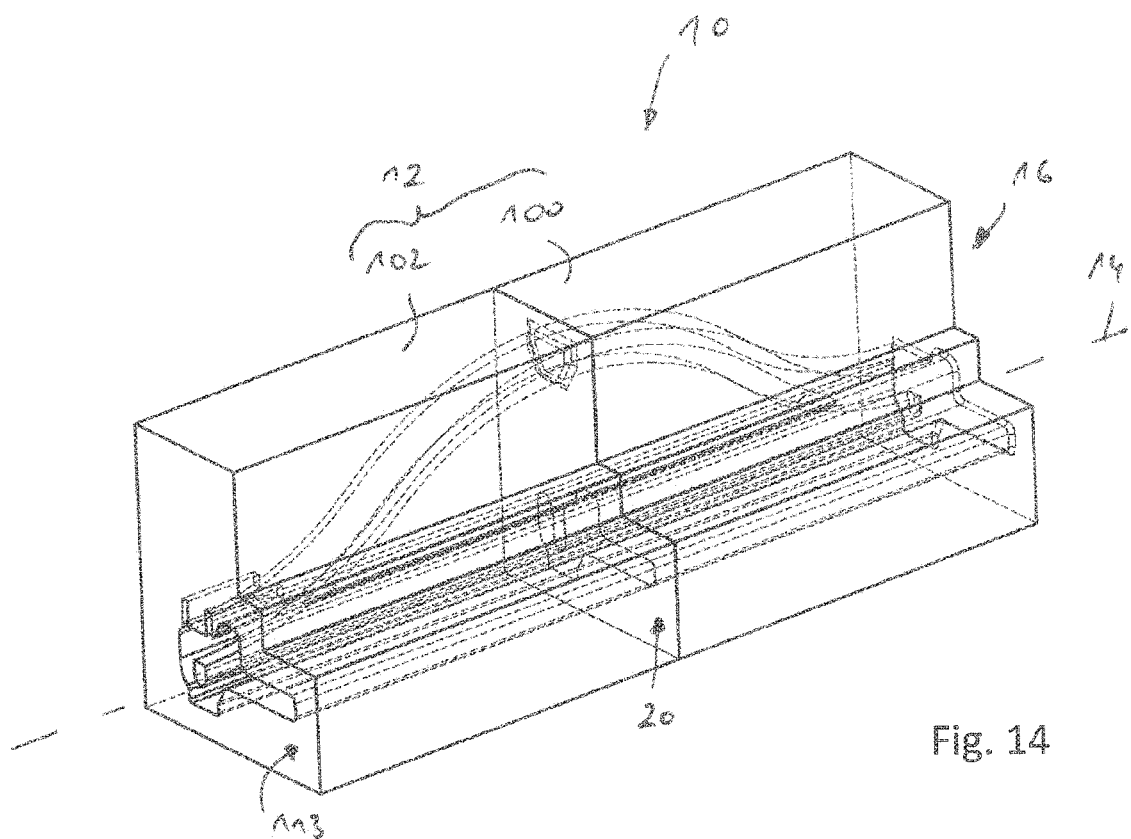
FIG. 14 a further embodiment of a mounting device with a merge area for a transport protection strip section that is separate from the receiving area of the profile strip to be merged with the profile strip.
Figure 15:
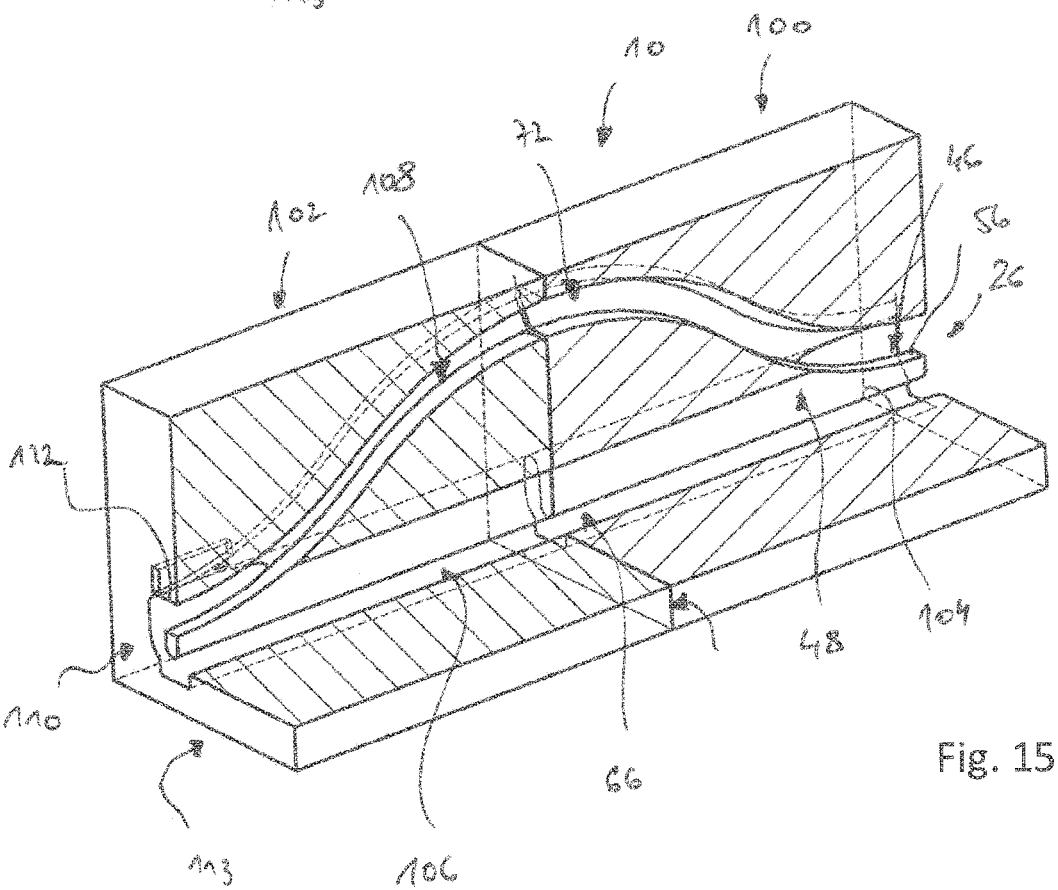
FIG. 15 the mounting device according to FIG. 14 in a partial section.

This reference also applies to the further embodiments of mounting devices 10 according to FIGS. 12 and 13. The mounting device according to FIG. 12 differs from the mounting device 10 according to FIGS. 1 to 9 in that the guide-in profile 28 is circumferentially closed, that is, the sidewall 32 has no guide-in profile opening 30 (see FIG. 1). This means that a section 94 of the guide-in area 26 is closed toward the sidewall 32, and a guide-in profile 28 is thus provided that is in its entirety circumferentially closed. As described above with reference to FIGS. 1 to 9, the circumferentially closed guide-in profile 28 merges into a profile strip guide-out area 66 that is likewise circumferentially closed at the exit side 20.

The embodiment of a mounting device 10 as illustrated in FIG. 12 with a circumferentially closed guide-in profile 28 serves to be used with a strip arrangement 18 that is not (yet) connected to a windowpane 36. In this context, the attaching section 42 (see FIG. 4) of the profile strip 22 is arranged in the section 94. For the rest, reference is made to the above description for FIGS. 1 to 9.

A mounting device 10 according to FIG. 13 has a guide-in area 26 with a funnel-shaped guide-in section 96, which extends, starting from the entry side 16, into the housing 12 of the mounting device 10 up to the guide-in profile 28 that is formed to be complementary to the cross section of the strip arrangement 18.

A mounting device 10 illustrated in the FIGS. 14 to 19 has a multi-piece housing 12 with a first housing part 100 and with a second housing part 102. The housing parts 100 and 102 are rigidly connected to each other, for example, glued to each other. It is also possible, however, that the mounting device 10 described below has only a one-piece housing 12.

A first housing part 100 of the mounting device 10 according to FIGS. 14 to 19 extends between an entry side 16 and an exit side 20 along a main axis 14. The housing part 100 has a guide-in area 26 and a separation area 46. Contrary to the above-described embodiments, a lifting means 48 of the separation area 46 is formed by a material section 104 of the housing part 100, it can, however, as an addition or alternative thereto be formed by an additional element 50. The material section 104 likewise has a ramp section 56.

Similar to the mounting device 10 according to FIGS. 1 to 9, a profile strip guide-out area 66 and a transport protection strip guide-out area 72, which lead to the exit side 20 of the first housing part 100, are provided in the first housing part 100. There, these areas merge into guide channels 106 for the profile strip 22 and 108 for the transport protection strip 24. The guide channels 106, 108 are arranged in the second housing part 102.

In particular in the instance of housing parts 100, 102 being movably connected to each other (and also in the instance illustrated in the drawing of housing parts 100, 102 being rigidly connected to each other), it is possible that there is a spacing between the exit side 20 of the first housing part 100 and a thereto adjacent entry side of the second housing part 102. This means that the exit of the profile strip guide-out area 66 and an entry of the guide channel 106, as well as an exit of the transport protection strip guide-out area 72 and an entry of the guide channel 108, are also spaced apart from each other. In this instance, in particular, it is advantageous for the guide channels 106, 108 to have funnel-shaped guide-in areas.

Independently of a potential spacing of the housing parts 100, 102, the guide channels 106, 108 of the second housing part 102 lead to a merge area 110, which serves for sections of the transport protection strip 24 and of the profile strip 22, which were previously separated from each other, to be reconnected to each other. For this purpose, a press-in section 112 is provided in the merge area, which press-in section 112 interacts with a topside of the transport protection strip 24 and which presses the transport protection strip 24 from its topside into the receiving area 40 of the profile strip 22, see FIG. 19.

The merge area 110 adjoins an exit side 113 of the second housing part 102, the exit side 113 facing away from the first housing part 100.

The press-in section 112 is an integral part of the housing material of the second housing part 102 and merges without transition into the upper boundary of the guide channel 108. However, the press-in section 112 can also be formed by a (non-illustrated) separate additional element, for example, by a metal press-in block or by a press-in roller.

Figure 16:
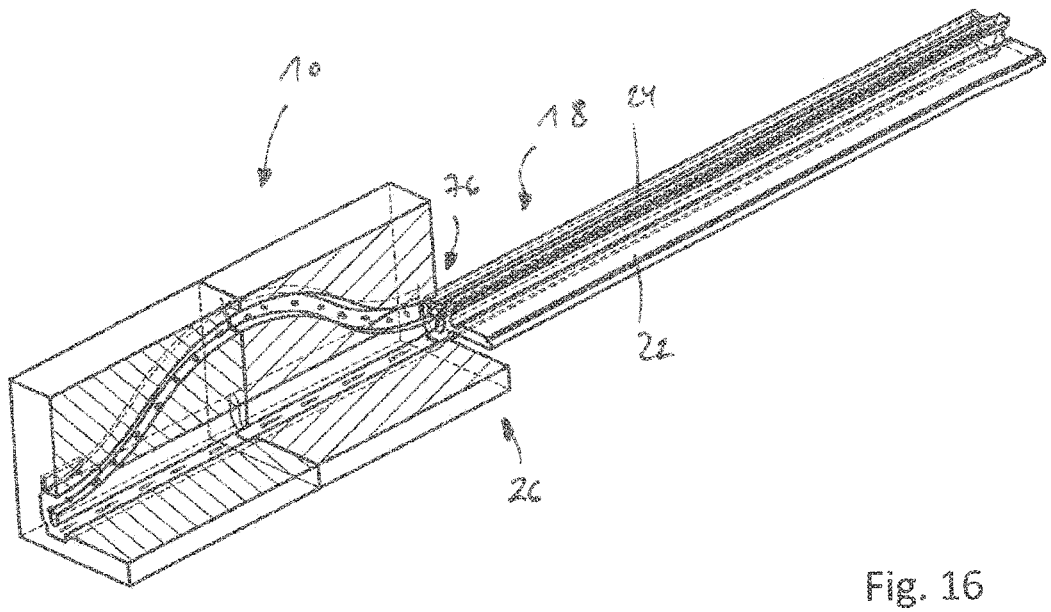
FIG. 16 an arrangement with the mounting device according to FIG. 14 and with a strip arrangement, prior to a free end of the strip arrangement being guided into a guide-in area of the mounting device.
Figure 17:
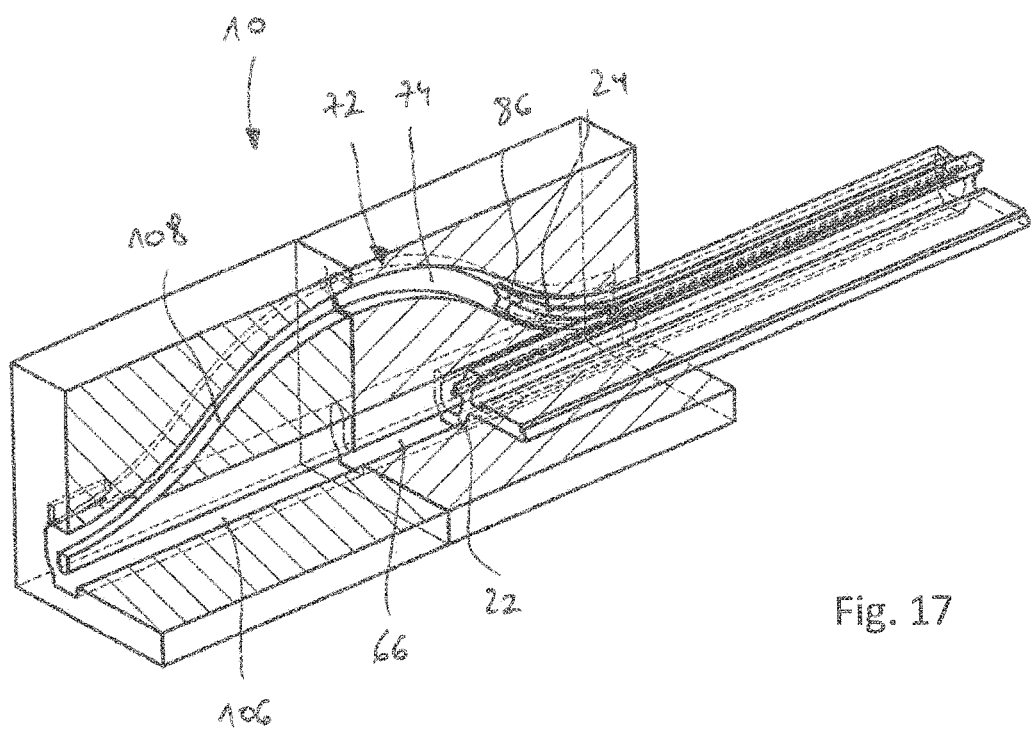
FIG. 17 the arrangement according to FIG. 16, after the free end of the strip arrangement has been guided into the guide-in area of the mounting device and after the free end of the transport protection strip has been separated from the profile strip in a separation area of the mounting device.
Figure 18:
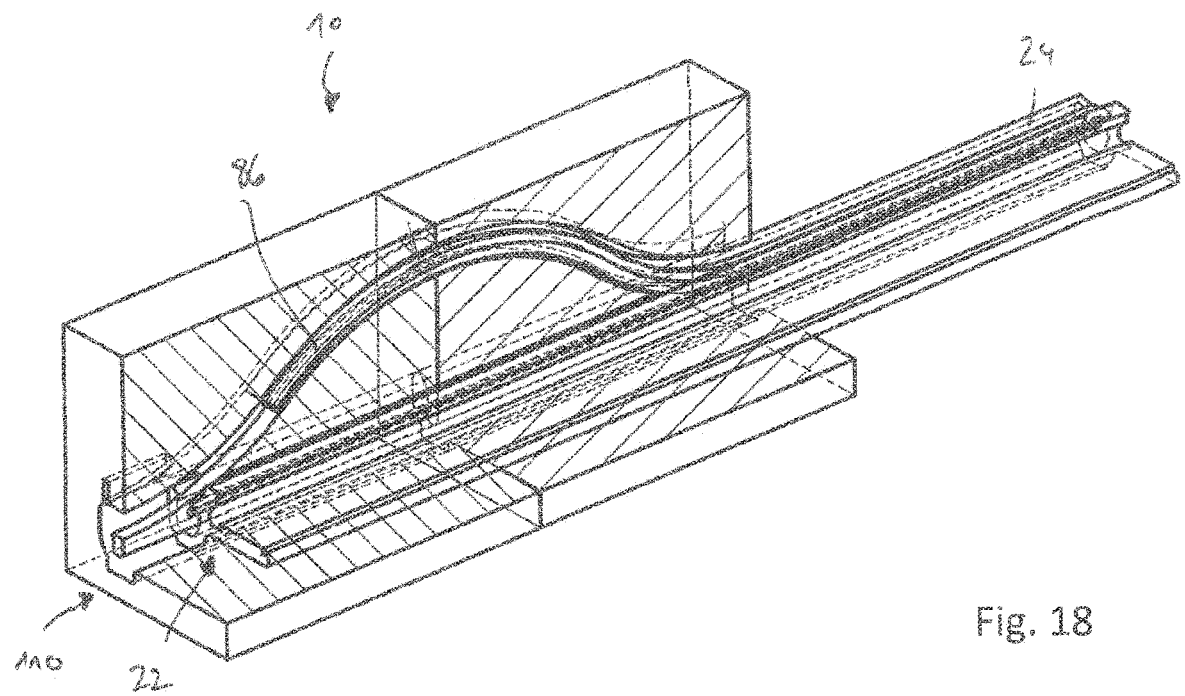
FIG. 18 the arrangement according to FIG. 16, prior to the transport protection strip section that is separate from the receiving area of the profile strip being merged with the profile strip.

A free end 76 of a strip arrangement 18 being guided into the guide-in area 26 is illustrated in the FIGS. 16 to 19 (an initial state is illustrated in FIG. 16). Subsequently, a section 86 of the transport protection strip 24 is separated from the profile strip 22 (see FIG. 17) in the manner described above with reference to FIGS. 1 to 9.

Afterward, the sections of the profile strip 22 and of the transport protection strip 24 that have been separated from each other are guided along the guide-out areas 66 and 72, respectively, and along the guide channels 106 and 108, respectively (see FIGS. 17 and 18), until they are reconnected to each other in the merge area 110 by the press-in section 112 pressing onto an upper end of the transport protection strip 24 and a lower end of the transport protection strip 24 thus being squeezed into the U-shaped receiving area 40 of the profile strip 22.

Figure 19:
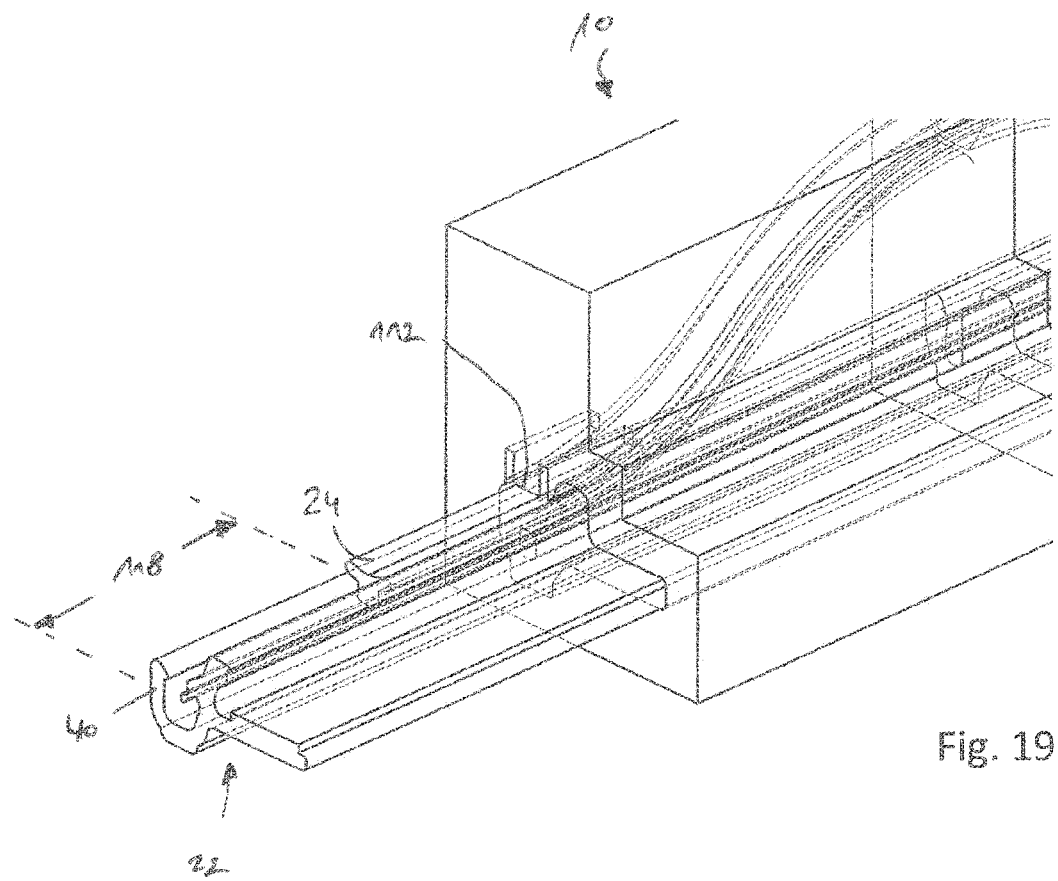
FIG. 19 a detail in enlarged illustration of the arrangement according to FIG. 16, after the transport protection strip section that is separate from the receiving area of the profile strip has been merged with the profile strip.

As is easily discernible from a comparison of the FIGS. 16 and 19, the free end 76 of the strip arrangement 18, with the free end 76 having been guided into the guide-in area 26, has ends of end faces of the transport protection strip 24 and of the profile strip 22 that are flush with each other. After the transport protection strip section 86 is separated from the profile strip 22 in the separation area 46, the transport protection strip section 86 passes through a guide path 114, which is indicated in FIG. 16 by dots, while the profile strip 22 passes through a guide path 116, which is illustrated by a dashed line in FIG. 16. In the context of an embodiment of the present invention, the guide path 116 is referred to as "first guide path" and the guide path 114 as "second guide path". It is easily discernible that the first guide path 116 runs in a largely straight manner, whereas the second guide path 114 has a curved course and thus is altogether longer than the first guide path 116. Compared to the originally flush arrangement of the free ends (see FIG. 16), the merging of previously separate sections of transport protection strip and profile strip 22 is consequently performed with an offset by a measure of length 118, as illustrated in FIG. 19. The measure of length 118 between free ends of the transport protection strip 24 and the profile strip 22 corresponds to the difference of the lengths of the guide paths 114 and 116.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A mounting device to be used with a strip arrangement, the strip arrangement comprising a profile strip arrangeable or arranged at an edge area of a windowpane of a motor vehicle and comprising a transport protection strip, wherein the transport protection strip is arranged at least with a portion of its cross section in a receiving area of the profile strip, the mounting device comprising:
   a guide-in area configured to guide a free end of the strip arrangement, including the profile strip and the transport protection strip, into the mounting device; and
   a separation area configured to separate the transport protection strip from the profile strip.

2. The mounting device according to claim 1, wherein the guide-in area has a guide-in profile that is at least in sections complementary to the cross section of the strip arrangement.

3. The mounting device according to claim 2, wherein the guide-in profile is circumferentially closed or has a guide-in profile opening in which the edge area of the windowpane is arrangeable.

4. The mounting device according to claim 2, wherein the guide-in profile is delimited by wall sections of a housing of the mounting device, by guide sections and/or by drive sections.

5. The mounting device according to claim 1, wherein the separation area has a lifting means with a ramp section that at least in sections reaches underneath the transport protection strip and lifts the transport protection strip out of the receiving area of the profile strip.

6. The mounting device according to claim 5, wherein the ramp section is formed by a section of a housing, or of the housing, of the mounting device and/or by a blade-shaped additional element.

7. The mounting device according to claim 1, further comprising a profile strip guide-out area and/or a transport protection strip guide-out area.

8. The mounting device according to claim 7, wherein the profile strip guide-out area and/or the transport protection strip guide-out area is or are terminally open.

9. The mounting device according to claim 7, wherein the profile strip guide-out area and/or the transport protection strip guide-out area is or are terminally closed.

10. The mounting device according to claim 1, further comprising a merge area configured to merge a section of the transport protection strip with the profile strip, the section of the transport protection strip being separate from the receiving area of the profile strip.

11. The mounting device according to claim 10, wherein the merge area includes a press-in section configured to press the transport protection strip at least with a portion of its cross section into the receiving area of the profile strip.

12. The mounting device according to claim 11, wherein the press-in section is formed by a section of a housing of the mounting device and/or by a block-shaped or roll-shaped additional element.

13. The mounting device according to claim 1, wherein the mounting device has a one-piece housing.

14. The mounting device according to claim 1, wherein the mounting device has a multi-piece housing, wherein the housing comprises a first housing part having at least the guide-in area and the separation area and comprises a second housing part having at least one merge area configured to merge a section of the transport protection strip with the profile strip, the section of the transport protection strip being separate from the receiving area of the profile strip.

15. The mounting device according to claim 14, wherein the housing parts are rigidly or movably connected to each other.

16. The mounting device according to claim 1, further comprising a drive configured to generate a relative movement between strip arrangement and mounting device, the relative movement being directed along the strip arrangement.

17. The mounting device according to claim 1, wherein the guide-in area is configured to relatively position the free end of the strip arrangement with respect to the separation area.

18. A method of using a mounting device with a strip arrangement, which comprises a profile strip arrangeable or arranged at an edge area of a windowpane of a motor vehicle and a transport protection strip, wherein the transport protection strip is arranged at least with a portion of its cross section in a receiving area of the profile strip, the method comprising:
    guiding a free end of the strip arrangement, including the profile strip and the transport protection strip, into a guide-in area of the mounting device; and
    separating a free end of the transport protection strip from the profile strip in a separation area of the mounting device.

19. The method according to claim 18, wherein a section of the transport protection strip adjacent to the free end of the transport protection strip is separated from the profile strip by a relative movement along the strip arrangement of the guide-in area and the separation area on the one hand and of the strip arrangement on the other hand.

20. The method according to claim 19, wherein the profile strip is guided along a first guide path, which has a first length, wherein a section of the transport protection strip, which section is separate from the profile strip, is guided along a second guide path, which has a second length that is different from the first length, wherein the transport protection strip and the profile strip are merged, and wherein at least a portion of the cross section of the transport protection strip is pressed into the receiving area of the profile strip.

21. The method according to claim 20, wherein the second length is greater than the first length.

22. The method according to claim 20, wherein the strip arrangement that is guided into the guide-in area:
    a) has ends of the profile strip and of the transport protection strip that are flush with each other, wherein the ends, after at least a portion of the cross section of the transport protection strip has been pressed into the receiving area of the profile strip, are offset by a measure of length corresponding to the difference of the lengths of the guide paths, or
    b) has ends of the profile strip and of the transport protection strip that are offset relative to each other by a first measure of length, wherein the ends, after at least a portion of the cross section of the transport protection strip has been pressed into the receiving area of the profile strip, are offset by a second measure of length that is different from the first measure of length, wherein the value of the difference between the first measure of length and the second measure of length corresponds to the difference of the lengths of the guide paths.

* * * * *